United States Patent
Liu et al.

(10) Patent No.: US 11,736,004 B2
(45) Date of Patent: Aug. 22, 2023

(54) METHOD AND APPARATUS FOR REDUCING EMI FOR A FREQUENCY-MODULATED DC-DC CONVERTER

(71) Applicant: Murata Manufacturing Co., Ltd., Nagaokakyo (JP)

(72) Inventors: Chuipong Liu, Hong Kong (CN); Hungpiu Poon, Hong Kong (CN)

(73) Assignee: MURATA MANUFACTURING CO., LTD., Kyoto (JP)

(*) Notice: Subject to any disclaimer, the term of this patent is extended or adjusted under 35 U.S.C. 154(b) by 105 days.

(21) Appl. No.: 17/333,182

(22) Filed: May 28, 2021

(65) Prior Publication Data

US 2021/0376716 A1    Dec. 2, 2021

(30) Foreign Application Priority Data

Jun. 1, 2020 (CN) .......................... 202010487150.5

(51) Int. Cl.
| | |
|---|---|
| *H02M 1/44* | (2007.01) |
| *H02M 3/155* | (2006.01) |
| *H02M 7/217* | (2006.01) |
| *H02M 1/00* | (2006.01) |

(52) U.S. Cl.
CPC ............. *H02M 1/44* (2013.01); *H02M 1/007* (2021.05); *H02M 1/0025* (2021.05); *H02M 3/155* (2013.01); *H02M 7/217* (2013.01)

(58) Field of Classification Search
CPC ...... H02M 1/44; H02M 1/007; H02M 1/0025; H02M 3/155; H02M 7/217
See application file for complete search history.

(56) References Cited

U.S. PATENT DOCUMENTS

| | | | |
|---|---|---|---|
| 7,071,660 B2 * | 7/2006 | Xu ........................ | H02M 3/156 323/272 |
| 2013/0134953 A1 | 5/2013 | Shi | |
| 2014/0307483 A1 * | 10/2014 | Sigamani ............ | H02M 1/4258 363/21.04 |

OTHER PUBLICATIONS

Official Communication issued in corresponding European Patent Application No. 21176670.4, dated Oct. 18, 2021.

* cited by examiner

*Primary Examiner* — Gary L Laxton
(74) *Attorney, Agent, or Firm* — Keating & Bennett, LLP

(57) ABSTRACT

A method for reducing EMI for a frequency-modulated DC-DC converter includes pre-regulating an input voltage of the frequency-modulated DC-DC converter, so that the frequency-modulated DC-DC converter changes an operating frequency of the frequency-modulated DC-DC converter to stabilize an output voltage of the frequency-modulated DC-DC converter, so as to achieve a desired frequency extension.

20 Claims, 3 Drawing Sheets

METHOD AND APPARATUS FOR REDUCING EMI FOR A FREQUENCY-MODULATED DC-DC CONVERTER

CROSS REFERENCE TO RELATED APPLICATIONS

This application claims the benefit of priority to Chinese Patent Application No. 202010487150.5 filed on Jun. 1, 2020. The entire contents of this application are hereby incorporated herein by reference.

BACKGROUND OF THE INVENTION

1. Field of the Invention

The present disclosure relates to a switching mode power supply, and more particularly, to a method and apparatus for reducing an average value of electromagnetic interference (EMI) of a frequency-modulated converter.

2. Description of the Related Art

A switching mode power supply is a high-frequency apparatus for electric energy conversion, which periodically turns on and turns off an electronic switching component through a control circuit by using a power semiconductor component (such as a bipolar transistor, MOS, etc.). Pulse modulation is performed on an input voltage by the power semiconductor component, so as to provide functions of voltage conversion, adjustable output voltage, and automatic voltage stabilization. For different switching mode power supply topologies, generally pulse width modulation (PWM) and frequency modulation are applied in switching mode power supplies.

High conversion efficiency and low electromagnetic interference (EMI) are key requirements for switching mode power supplies.

For switching mode power supplies using PWM control, direct switching frequency modulation is a known mechanism to effectively reduce the level of average EMI noise. Direct switching frequency modulation causes a switching frequency of the PWM-controlled converter to jitter, spreading a spectrum of the switching noise, and reducing the level of average EMI noise. Switching-frequency-modulated resonance and quasi-resonant converter topologies are used in the frequency-modulated switching mode power supply, so that switching loss of a power semiconductor component may be minimized. Although direct switching frequency modulation is suitable for PWM switching mode power supplies to reduce EMI noise, direct switching frequency modulation is not suitable for switching-frequency-modulated converters. This will increase requirements for EMI filters, such that a large size of filter is required by the frequency-modulated switching mode power supplies, and thus more power loss is caused.

Thus, an effective mechanism suitable for the frequency-modulated switching mode power supply to reduce the average EMI noise and reduce the size and loss of the EMI filter is desired.

SUMMARY OF THE INVENTION

Preferred embodiments of the present invention reduce the average EMI noise of frequency-modulated switching mode power supplies. Specifically, according to preferred embodiments of the present invention, an input voltage of a frequency-modulated converter is regulated, so that the regulated voltage is varied in a pre-defined mode. Then the regulated voltage is provided as the input voltage of the frequency-modulated converter. As the input voltage varies, the frequency-modulated converter may change a switching frequency according to a feedback control loop of the frequency-modulated converter, in order to stabilize an output voltage of the frequency-modulated converter. Thus, according to preferred embodiments of the present disclosure, the frequency-modulated DC-DC converters may each stabilize an output of the frequency-modulated DC-DC converter while achieving frequency modulation naturally. In this way, a spectrum of switching noise may be spread, thus reducing a level of average EMI noise.

According to a preferred embodiment of the present invention, a method for reducing electromagnetic interference EMI for a frequency-modulated DC-DC converter includes pre-regulating an input voltage of the frequency-modulated DC-DC converter, so that the frequency-modulated DC-DC converter changes an operating frequency of the frequency-modulated DC-DC converter to stabilize an output voltage of the frequency-modulated DC-DC converter, so as to achieve a desired spread spectrum.

In a preferred embodiment of the present invention, the pre-regulating may be performed by a pre-regulator.

According to a preferred embodiment of the present invention, a pre-regulator for a frequency-modulated DC-DC converter includes an input terminal that receives an input voltage; a reference voltage terminal that receives a reference voltage, wherein the reference voltage is a varying reference voltage; a converter that converts the obtained input voltage into an output voltage based on the reference voltage, wherein the output voltage is varied with the reference voltage; an output terminal that provides the output voltage as an input voltage of the frequency-modulated DC-DC converter. The output voltage of the pre-regulator is varied so that the frequency-modulated DC-DC converter changes an operating frequency of the frequency-modulated DC-DC converter to stabilize an output voltage of the frequency-modulated DC-DC converter, so as to achieve a desired frequency extension.

In a preferred embodiment of the present invention, the frequency-modulated DC-DC converter may be an isolated frequency-modulated DC-DC converter. In another preferred embodiment of the present invention, the frequency-modulated DC-DC converter may be a non-isolated frequency-modulated DC-DC converter.

In a preferred embodiment of the present invention, the desired frequency extension may be determined according to a desired reduction of an average value of the electromagnetic interference EMI noise.

In a preferred embodiment of the present invention, the pre-regulator may be configured to generate a varying output voltage according to a varying reference voltage, so that the varying output voltage is provided as the input voltage of the frequency-modulated DC-DC converter.

A varying portion of the reference voltage is a reference modulation voltage, the reference modulation voltage is determined according to $V_{ref\_modulation} = f_{sw}/G_{ref\_DCbus} G_{DCbus\_f}$ (1), wherein $f_{sw}$ is the operating frequency of the frequency-modulated DC-DC converter, $G_{DCbus\_f}$ is a transfer function from the input voltage of the frequency-modulated DC-DC converter to the operating frequency of the frequency-modulated DC-DC converter, and $G_{ref\_DCbus}$ is a transfer function from the reference voltage of the pre-regulator to the output voltage of the pre-regulator.

Optionally, the pre-regulator may include a PWM converter.

The PWM converter may include a PWM AC-DC converter and/or a PWM DC-DC converter.

Optionally, the pre-regulator may include a boost converter.

Optionally, the pre-regulator may include a buck converter.

According to a preferred embodiment of the present invention, a switching mode power supply includes a pre-regulator according to a preferred embodiment of the present invention, and a frequency-modulated DC-DC converter. The output terminal of the pre-regulator is coupled to an input terminal of the frequency-modulated DC-DC converter.

According to preferred embodiments of the present invention, a solution suitable to reduce average EMI noise for frequency-modulated converters is provided. An input voltage of each of the frequency-modulated converters may be pre-regulated by a frequency-modulated switching mode power supply according to preferred embodiments of the present invention, so as to naturally regulate the switching frequency. In this way, a switching noise spectrum may be spread, a level of average EMI noise may be reduced, and requirements in size of the required EMI filter may be reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
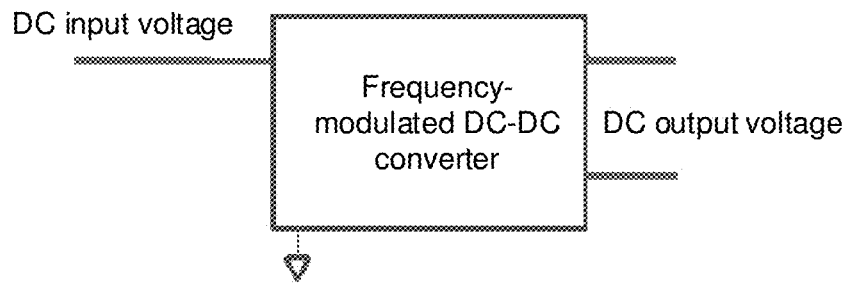
FIG. 1 schematically shows an example of a frequency-modulated DC-DC converter.

Preferred embodiments of the present invention will be described in detail below with reference to the drawings. The same or corresponding elements and component are denoted by the same reference characters in the drawings.

The present invention should not be limited to the specific preferred embodiments described below. In addition, for brevity, detailed descriptions of well-known technologies that are not directly related to preferred embodiments of the present invention are omitted to prevent confusion in the understanding of the preferred embodiments of the present invention.

FIG. 1 schematically shows an example of a frequency-modulated DC-DC converter.

As shown in FIG. 1, a DC-DC converter may convert a direct current (input voltage) into another direct current (output voltage) to achieve voltage conversion. As known in the existing technologies, the frequency-modulated DC-DC converter shown in FIG. 1 may be any converter topology used by a frequency-modulated switching mode power supply. In an operating process, a driving signal has a constant pulse width. A relationship between the output voltage and the input voltage is regulated by different frequencies of pulses.

In the existing technologies, a stable input voltage is usually required, in order to stabilize an output voltage. However, fluctuations of an input voltage are inevitable. A DC-DC converter usually includes a feedback control loop, in order to obtain a stable output. In a case in which the output voltage fluctuates, the frequency-modulated DC-DC converter may change the frequency of pulses by using the feedback control loop. In this way, the circuit may be controlled and regulated to stabilize the output voltage of the frequency-modulated DC-DC converter.

EMI noise reduction in a frequency-modulated DC-DC converter will be described below.

As described above, direct switching frequency modulation is not suitable for a frequency-modulated converter, because changes in switching frequency may affect the relationship between the output voltage and the input voltage. The output voltage may jitter, which is undesirable.

Unlike conventionally providing a stable input voltage to stabilize an output voltage, an input voltage of a frequency-modulated converter is pre-regulated, so that the regulated voltage is varied in a pre-defined mode. Then the regulated voltage is provided as an input voltage of the frequency-modulated converter. As the input voltage varies, the frequency-modulated converter may change a switching frequency according to a feedback control loop of the frequency-modulated converter, in order to stabilize an output voltage of the frequency-modulated converter. According to preferred embodiments of the present invention, the input voltage is purposefully changed, and an inherent feedback control function of the frequency-modulated DC-DC converter is used. Thus, a switching frequency may be naturally modulated, a switching noise spectrum may be spread, and a level of average EMI noise may be reduced.

Figure 2:
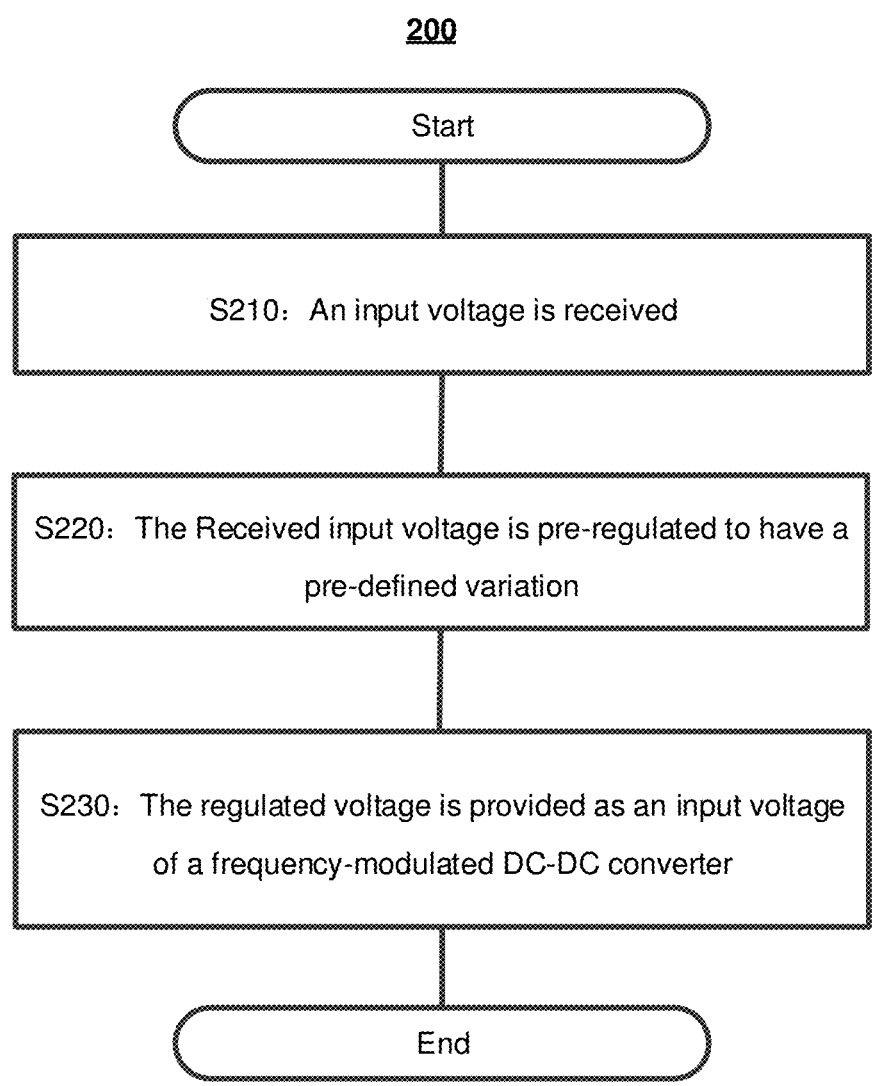
FIG. 2 schematically shows a flowchart of a method for reducing average electromagnetic interference EMI for a frequency-modulated DC-DC converter according to a preferred embodiment of the present invention.

FIG. 2 schematically shows a flowchart of a method 200 for reducing average electromagnetic interference EMI for a frequency-modulated DC-DC converter according to a preferred embodiment of the present invention.

As shown in FIG. 2, in operation S210, an input voltage is obtained. The input voltage may be a direct current voltage or an alternating current voltage.

In operation S220, the obtained input voltage is pre-regulated to have a pre-defined variation. The pre-defined variation may be determined according to a desired reduction of an average value of the electromagnetic interference EMI noise, a circuit design and/or an experiment.

In case that the input voltage is an alternating current voltage, the alternating current voltage needs to be converted into a direct current voltage. The AC-DC conversion may be provided using any existed or future-developed AC-DC converters, which will not be repeated here. According to a preferred embodiment of the present invention, the obtained direct current voltage (the direct current voltage obtained in operation S210, or the direct current voltage obtained by AC-DC conversion of the alternating current voltage in operation S210) may be modulated to have a pre-defined variation.

In operation S230, the regulated voltage is provided as an input voltage of a frequency-modulated DC-DC converter. The input voltage of the frequency-modulated DC-DC converter has the pre-defined variation, so that the frequency-modulated DC-DC converter may change an operating frequency of the frequency-modulated DC-DC converter, in order to stabilize the output voltage of the frequency-modulated DC-DC converter, thus achieving a desired frequency extension.

With the method 200, a frequency spectrum of switching noise of a frequency-modulated DC-DC converter may be naturally spread, and a level of average EMI noise may be reduced.

Figure 3:
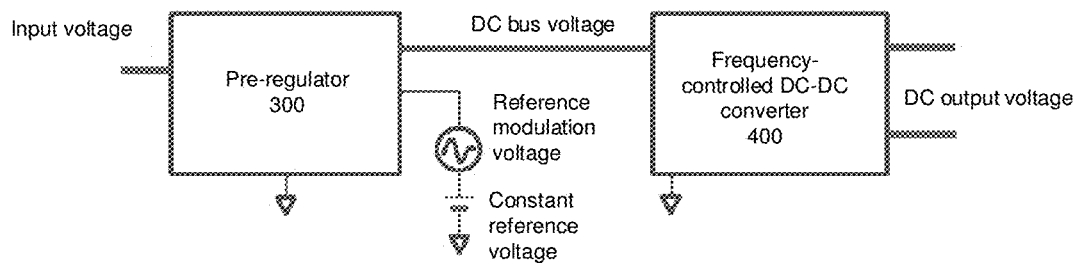
FIG. 3 schematically shows an example of a pre-regulator and a frequency-modulated DC-DC converter therefor according to a preferred embodiment of the present invention.

FIG. 3 schematically shows an example of a frequency-modulated DC-DC converter 400 and a pre-regulator 300 for the frequency-modulated DC-DC converter 400 according to a preferred embodiment of the present invention.

The frequency-modulated DC-DC converter 400 may be a specific example of the converter shown in FIG. 1.

The pre-regulator 300 is configured to generate a varying output voltage according to a varying reference voltage, so that the varying output voltage is provided as the input voltage of the frequency-modulated DC-DC converter. The pre-regulator 300 may utilize the method 200 shown in FIG. 2.

The pre-regulator 300 may be used as a voltage converter, including an input terminal, a reference voltage terminal, and an output terminal.

The input terminal of the pre-regulator 300 may be configured to receive an input voltage.

The reference voltage terminal of the pre-regulator 300 may be configured to receive a reference voltage. The reference voltage includes a varying portion.

The pre-regulator 300 is operated to convert an obtained input voltage into an output voltage (also called a DC bus voltage in FIG. 3) based on the reference voltage. The DC bus voltage is varied with the varying reference voltage.

The output terminal of the pre-regulator 300 may be configured to provide the DC bus voltage as the input voltage of the frequency-modulated DC-DC converter.

The input voltage obtained by the input terminal of the pre-regulator 300 may be an alternating current voltage or a direct current voltage. Different converters may be selected as the pre-regulator 300 according to different types of input voltages. If the input voltage is an alternating current voltage, an AC-DC converter, for example, may be selected as the pre-regulator 300. If the input voltage is a direct current voltage, a DC-DC converter, for example, may be selected as the pre-regulator 300. Generally, a PWM converter, for example, may be selected as the pre-regulator 300.

The pre-regulator 300 may be provided using an existing voltage converter. A reference voltage terminal of a voltage converter in the existing technologies is usually coupled to a constant reference voltage, while in the present preferred embodiment, the reference voltage of the voltage converter may not be a constant voltage, but may have a pre-defined variation. For brevity, the varying portion of the reference voltage is also referred to as a reference modulation voltage. The output voltage (DC bus voltage) of the pre-regulator 300 may be controlled to vary in a required mode, by controlling the variation of the reference voltage.

The pre-regulator 300 is coupled in cascade with the frequency-modulated DC-DC converter 400. The frequency-modulated DC-DC converter 400 may be an isolated frequency-modulated DC-DC converter or a non-isolated frequency-modulated DC-DC converter, for example, and the present invention is not limited to this. The DC bus voltage fed into the frequency-modulated DC-DC converter 400 is controlled to vary according to the required mode, so that the frequency-modulated DC-DC converter 400 may respond by changing a switching frequency of the frequency-modulated DC-DC converter 400. In this manner, the output voltage of the frequency-modulated DC-DC converter may be stabilized and the spectrum may be spread.

A range in which the operating frequency (i.e., a switching frequency $f_{sw}$) of the converter is extended, and a mode in which the operating frequency is changed should be considered, in order to effectively reduce the average EMI noise of the frequency-modulated DC-DC converter, thus achieving an effective reduction of average noise. For example, typical conducted EMI specifications require an apparatus to meet both a quasi-peak limit and an average limit. An average limit required by commonly used standards (such as FCC15, EN55022, and Cispr 22) is lower than a quasi-peak limit of Class A by about 13 dBuV and lower than an average limit required by Class B by about 10 dBuV, for example. In practice, the level of average EMI noise may be the same as or similar to the quasi-peak level, depending on an operating condition and a converter topology. In addition, a spread spectrum range of an operating frequency of a converter should be larger than a bandwidth of a bandpass filter of an EMI measurement apparatus according to the EMI standard, in order to reduce an average noise of a fundamental frequency component. For conducted EMI standards such as FCC15 and EN55022, for example, a bandwidth of a bandpass filter is about 9 kHz. This determines the range in which the switching frequency $f_{sw}$ is extended and a mode in which the switching frequency $f_{sw}$ is changed.

As described above, as the input voltage varies, the frequency-modulated converter may change a switching frequency according to a feedback control loop of the frequency-modulated converter, in order to stabilize the output voltage of the frequency-modulated DC-DC converter 400. The relationship between the operating frequency $f_{sw}$ of the frequency-modulated DC-DC converter 400 and the input voltage $V_{DC\_bus}$ of the frequency-modulated DC-DC converter 400 is determined by a topology of the converter 400, and may be expressed as formula (1).

$$f_{sw} = V_{DC\_bus} G_{DCbus\_f} \qquad (1)$$

wherein, $f_{sw}$ is the operating frequency of the frequency-modulated DC-DC converter 400, $V_{DC\_bus}$ is the input voltage of the frequency-modulated DC-DC converter 400, and $G_{DCbus\_f}$ is a transfer function from the input voltage of the frequency-modulated DC-DC converter 400 to the operating frequency of the frequency-modulated DC-DC converter 400.

After the desired range in which $f_{sw}$ is extended and the desired mode in which $f_{sw}$ is varied are determined according to the desired reduction of an average value of the electromagnetic interference EMI noise, a mode in which $V_{DC\_bus}$ is varied may be easily obtained according to formula (2).

$$V_{DC\_bus} = f_{sw}/G_{DCbus\_f} \qquad (2)$$

For a given frequency-modulated DC-DC converter 400, $G_{DCbus\_f}$ is determined. Thus, the desired range in which the input voltage $V_{DC-bus}$ is varied and a mode in which the input voltage $V_{DC-bus}$ is varied may be determined according to the desired reduction of an average value of the electromagnetic interference EMI noise.

In a case in which the desired range in which the $V_{DC-bus}$ is varied and a mode in which the $V_{DC-bus}$ is varied are known, the desired range in which the reference voltage is varied, and a desired mode in which the reference voltage is varied may be determined. Assuming that a transfer function from the reference voltage to the output voltage of the pre-regulator 300 is $G_{ref\_DCbus}$, then $V_{DC-bus}$ may be expressed as formula (3).

$$V_{DC\text{-}bus} = V_{ref\_modulation} G_{ref\_DCbus} \quad (3)$$

wherein, $V_{ref\_modulation}$ is the reference modulation voltage of the pre-regulator 300, $V_{DC-bus}$ is the output voltage of the pre-regulator 300, and $G_{ref\_DCbus}$ is the transfer function from the reference voltage of the pre-regulator 300 to the output voltage of the pre-regulator 300.

Formulas (4) and (5) may be obtained based on formulas (1) and (3).

$$f_{sw} = V_{ref\_modulation} G_{ref\_DCbus} G_{DCbus\_f} \quad (4)$$

$$V_{ref\_modulation} = f_{sw}/(G_{ref\_DCbus} G_{DCbus\_f}) \quad (5)$$

The mode in which the reference modulation voltage $V_{ref\_modulation}$ of the pre-regulator 300 is varied may be determined according to the desired range in which $f_{sw}$ is extended and the mode in which $f_{sw}$ is varied, by using formula (5).

It should be understood that the preferred embodiments of the present invention do not limit the modulation range, changing mode, or the determination method of $f_{sw}$ and $V_{ref\_modulation}$. The modulation range, changing mode, or the determination method of $f_{sw}$ and $V_{ref\_modulation}$ may be determined based on a required reduction of EMI noise, a circuit design, and/or even an experimentation.

In the preferred embodiment shown in FIG. 3, the input voltage is pre-regulated, and the DC bus voltage fed into the frequency-modulated DC-DC converter 400 is controlled to change according to the required mode, so that the frequency-modulated DC-DC converter 400 may respond by changing a switching frequency. In this manner, the switching noise spectrum may be spread, the level of average EMI noise may be reduced, and the size requirements for the required EMI filter may be reduced.

A practical example is provided to describe an advantageous effect of reducing the average EMI noise according to preferred embodiments of the present invention.

Figure 4:
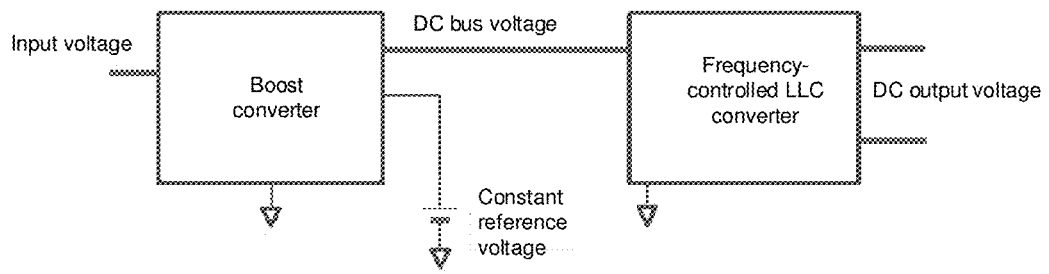
FIG. 4 schematically shows an example of a unit under test (UUT) including a cascaded boost converter and a frequency-modulated LLC converter.

FIG. 4 schematically shows an example of a unit under test (UUT) including a cascaded boost converter and a frequency-modulated LLC converter, wherein DC bus modulation according to a preferred embodiment of the present invention is not applied, i.e., the reference voltage used by the boost converter is a constant voltage. This configuration is common in many applications, including server power supplies. The boost converter may accept AC and DC inputs.

Figure 6:
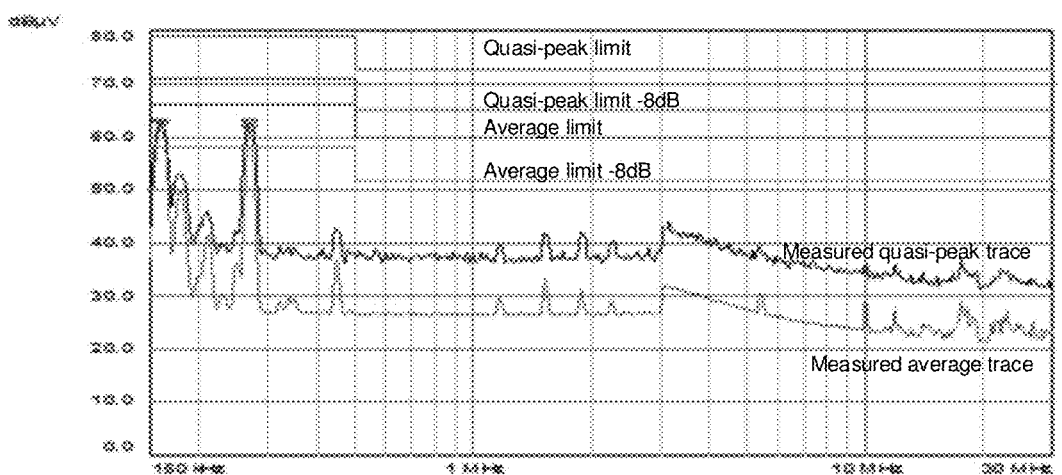
FIG. 6 shows a diagram of an EMI test result of the unit under test in FIG. 4.

FIG. 6 shows a diagram of an EMI test result of the unit under test in FIG. 4 at 240V DC input and 1500 W according to EN55022 Class A requirements. The quasi-peak limit, the quasi-peak limit −8 dB, the average limit, the average limit −8 dB, the measured quasi-peak trace and the measured average trace are shown in FIG. 6. The measurement result meets the EN55022 Class A limit, but the levels of average noise at about 163 kHz and about 272 kHz do not meet the margin requirement of about 8 dB according to the UUT product specifications.

Figure 5:
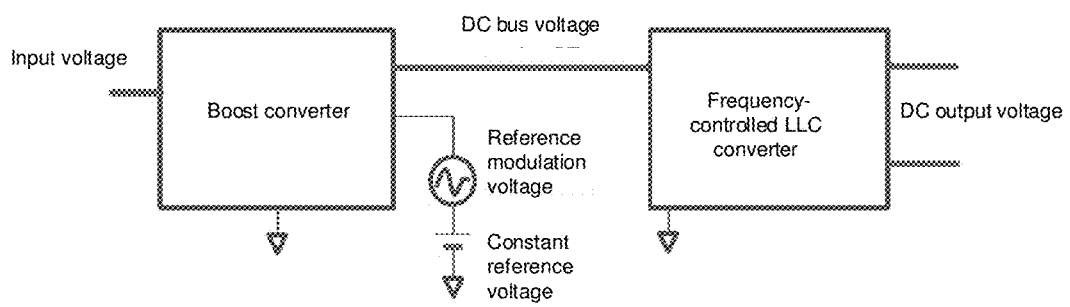
FIG. 5 schematically shows an example of a unit under test (UUT) obtained by applying a DC bus according to a preferred embodiment of the present invention on the unit in FIG. 4.
Figure 7:
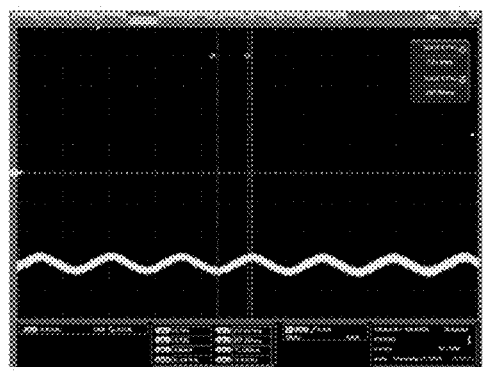
FIG. 7 shows an example of a reference modulation voltage.
Figure 8:
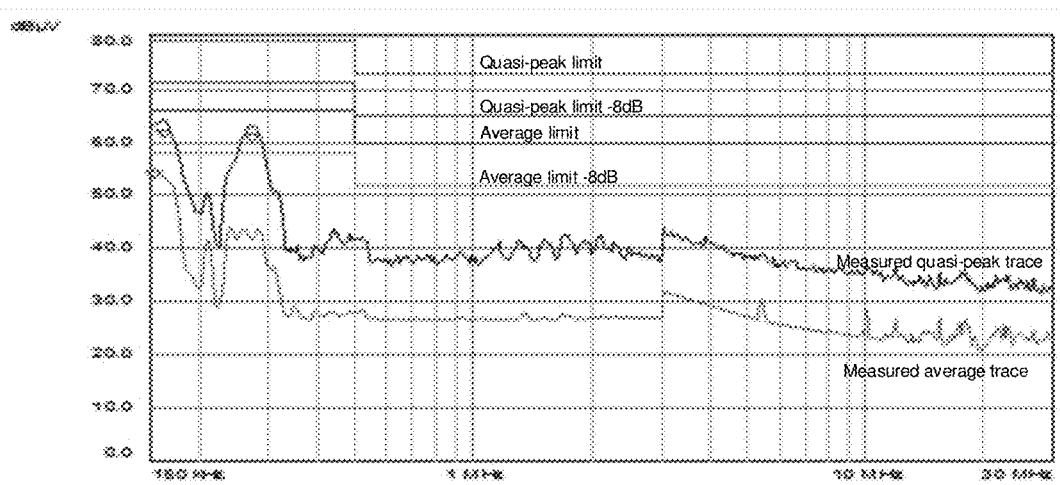
FIG. 8 shows a diagram of an EMI test result of the unit under test in FIG. 5.

For comparison, a unit under test in FIG. 5 is obtained by applying DC bus modulation according to a preferred embodiments of the present invention to the unit under test in FIG. 4. The unit of FIG. 5 may be regarded as a specific example of the unit of FIG. 3. The pre-regulator 300 is a numerically controlled boost converter, and the frequency-modulated DC-DC converter 400 is a frequency-modulated LLC converter. A 10 V peak-to-peak sinusoidal voltage shown in FIG. 7 is used as the reference modulation voltage to modulate the DC bus voltage. The modulation signal is generated by a digital controller. The digital controller modulates the reference voltage for DC bus voltage modulation through calculations. Under the same input and output conditions as in FIG. 6, the results obtained by testing the UUT in FIG. 5 are shown in FIG. 8. As shown in FIG. 8, in a case in which a spread EMI noise spectrum is observed, the level of average noise is much lower and meets the requirement of an average value of about −8 dB without changing the EMI filter.

According to the examples shown in FIGS. 4-8, the average EMI noise of the frequency-modulated DC-DC converter may be effectively reduced by applying DC bus modulation according to a preferred embodiment of the present invention.

It should be understood that FIG. 3 not only shows an example of a pre-regulator according to a preferred embodiment of the present invention, and a new type of switching mode power supply reducing average EMI noise is also provided by combining the pre-regulator shown in FIG. 3 with a cascaded DC-DC converter.

It should be noted that in the above description, the technical solutions and advantageous effects of preferred embodiments of the present invention are shown and described by way of example only. The present invention is not limited to the above operations and unit structures. The operations and unit structures may be adjusted and selected as needed. Therefore, some operations and units are not necessary elements of the present invention. Thus, the technical features of the present invention are only limited to the minimum requirements that may achieve the advantageous effects described, and are not limited by the above specific examples of preferred embodiments of the present invention.

In addition, the reference modulation signal in preferred embodiments of the present disclosure may be provided by, for example, but not limited to, a microcontroller unit MCU, a digital signal processor, a processor, a chip, and/or a discrete component.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for reducing electromagnetic interference (EMI) for a frequency-modulated DC-DC converter, the method comprising:
pre-regulating an input voltage of the frequency-modulated DC-DC converter, so that the frequency-modulated DC-DC converter changes an operating frequency of the frequency-modulated DC-DC converter to stabilize an output voltage of the frequency-modulated DC-DC converter, so as to achieve a desired frequency extension; wherein
a spread spectrum range of the operating frequency of the frequency-modulated DC-DC converter is larger than a bandwidth of a bandpass filter of an EMI measurement apparatus.

2. The method according to claim 1, wherein the desired frequency extension is determined according to a desired reduction of an average value of an EMI noise.

3. The method according to claim 1, wherein the pre-regulating is performed by a pre-regulator, the pre-regulator is configured to generate a varying output voltage according to a varying reference voltage, so that the varying output voltage is provided as the input voltage of the frequency-modulated DC-DC converter.

4. The method according to claim 2, wherein the pre-regulating is performed by a pre-regulator, the pre-regulator is configured to generate a varying output voltage according to a varying reference voltage, so that the varying output voltage is provided as the input voltage of the frequency-modulated DC-DC converter.

5. The method according to claim 3, wherein a varying portion of the varying reference voltage is a reference modulation voltage, the reference modulation voltage is determined according to Vref_modulation=fsw/Gref_DCbus GDCbus_f, where fsw is the operating frequency of the frequency-modulated DC-DC converter, GDCbus_f is a transfer function from the input voltage of the frequency-modulated DC-DC converter to the operating frequency of the frequency-modulated DC-DC converter, and Gref_DCbus is a transfer function from the varying reference voltage of the pre-regulator to the output voltage of the pre-regulator.

6. The method according to claim 4, wherein a varying portion of the varying reference voltage is a reference modulation voltage, the reference modulation voltage is determined according to Vref_modulation=fsw/Gref_DCbus GDCbus_f, where fsw is the operating frequency of the frequency-modulated DC-DC converter, GDCbus_f is a transfer function from the input voltage of the frequency-modulated DC-DC converter to the operating frequency of the frequency-modulated DC-DC converter, and Gref_DCbus is a transfer function from the varying reference voltage of the pre-regulator to the output voltage of the pre-regulator.

7. The method according to claim 1, wherein the frequency-modulated DC-DC converter includes an isolated frequency-modulated DC-DC converter and a non-isolated frequency-modulated DC-DC converter.

8. The method according to claim 2, wherein the frequency-modulated DC-DC converter includes an isolated frequency-modulated DC-DC converter and a non-isolated frequency-modulated DC-DC converter.

9. The method according to claim 3, wherein the pre-regulator includes a pulse width modulation (PWM) converter.

10. The method according to claim 4, wherein the pre-regulator includes a pulse width modulation (PWM) converter.

11. The method according to claim 9, wherein the PWM converter includes a PWM AC-DC converter and a PWM DC-DC converter.

12. The method according to claim 10, wherein the PWM converter includes a PWM AC-DC converter and a PWM DC-DC converter.

13. A pre-regulator for a frequency-modulated DC-DC converter comprising:
an input terminal that receives an input voltage;
a reference voltage terminal that receives a reference voltage, wherein the reference voltage is a varying reference voltage;
a converter that converts the input voltage into an output voltage based on the reference voltage, wherein the output voltage is varied with the reference voltage;
an output terminal that provides the output voltage as an input voltage of the frequency-modulated DC-DC converter; wherein
the output voltage of the pre-regulator is varied so that the frequency-modulated DC-DC converter changes an operating frequency of the frequency-modulated DC-DC converter to stabilize an output voltage of the frequency-modulated DC-DC converter, so as to achieve a desired frequency extension; and
a spread spectrum range of the operating frequency of the frequency-modulated DC-DC converter is larger than a bandwidth of a bandpass filter of an EMI measurement apparatus.

14. The pre-regulator of claim 13, wherein a mode in which the reference voltage is varied is determined according to a desired reduction of an average value of an electromagnetic interference (EMI) noise.

15. The pre-regulator of claim 13, wherein the varying reference voltage is a reference modulation voltage, the reference modulation voltage is determined according to Vref_modulation=fsw/Gref_DCbus GDCbus_f, where fsw is the operating frequency of the frequency-modulated DC-DC converter, GDCbus_f is a transfer function from the input voltage of the frequency-modulated DC-DC converter to the operating frequency of the frequency-modulated DC-DC converter, and Gref_DCbus is a transfer function from the varying reference voltage of the pre-regulator to the output voltage of the pre-regulator.

16. The pre-regulator of claim 14, wherein the varying reference voltage is a reference modulation voltage, the reference modulation voltage is determined according to Vref_modulation=fsw/Gref_DCbus GDCbus_f, where fsw is the operating frequency of the frequency-modulated DC-DC converter, GDCbus_f is a transfer function from the input voltage of the frequency-modulated DC-DC converter to the operating frequency of the frequency-modulated DC-DC converter, and Gref_DCbus is a transfer function from the varying reference voltage of the pre-regulator to the output voltage of the pre-regulator.

17. The pre-regulator of claim 13, wherein the frequency-modulated DC-DC converter includes an isolated frequency-modulated DC-DC converter and a non-isolated frequency-modulated DC-DC converter.

18. The pre-regulator of claim 13, wherein the pre-regulator includes a pulse width modulation (PWM) converter.

19. The pre-regulator of claim 18, wherein the PWM converter includes a PWM AC-DC converter and a PWM DC-DC converter.

20. A switching mode power supply, comprising:
the pre-regulator of claim 13; and
the frequency-modulated DC-DC converter; wherein
the output terminal of the pre-regulator is coupled to an input terminal of the frequency-modulated DC-DC converter.

* * * * *